United States Patent Office 2,957,565
Patented Oct. 25, 1960

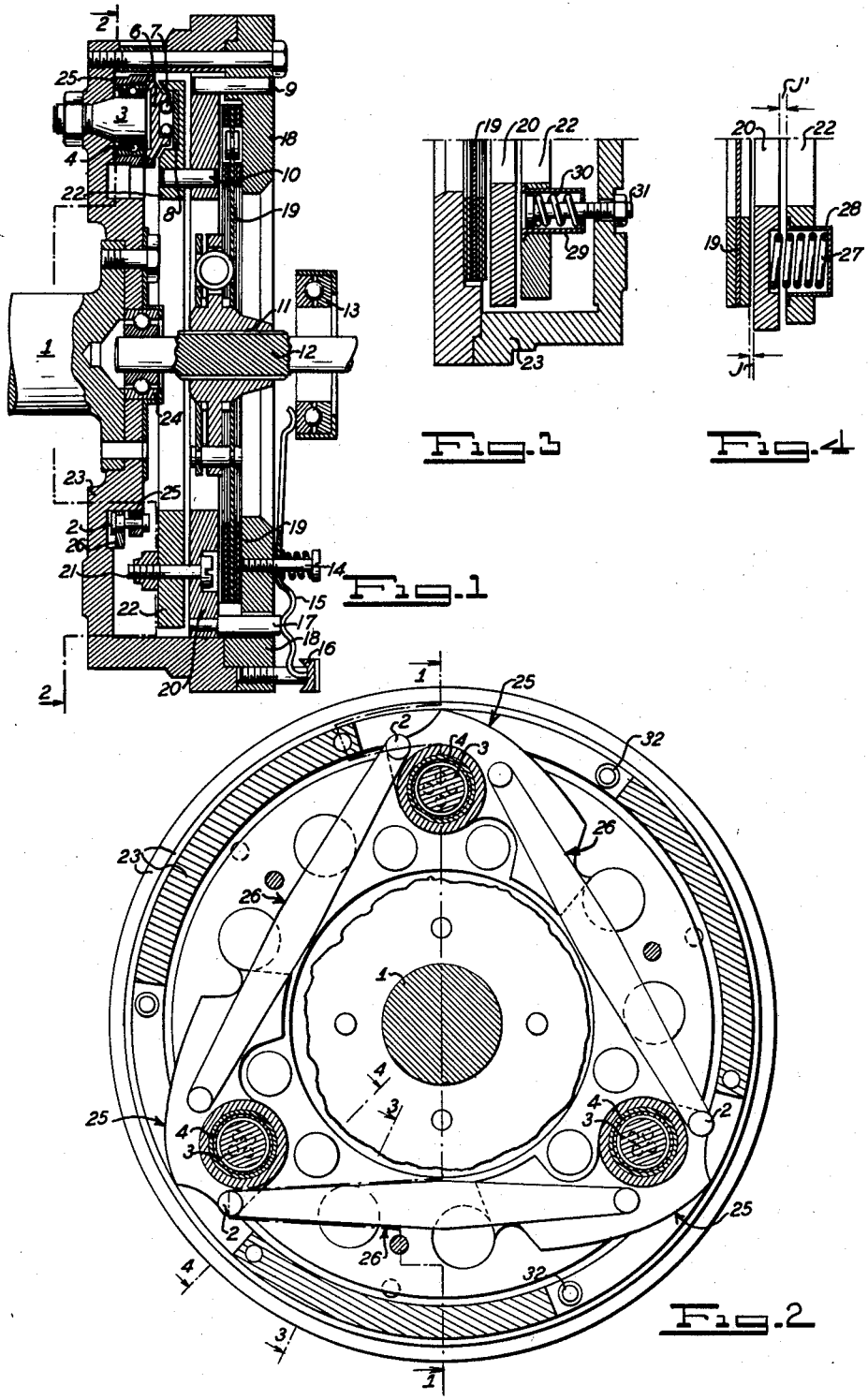

2,957,565

CENTRIFUGAL CLUTCH

Antoine Brueder, Paris, France, assignor to Societe Anonyme Andre Citroen, Paris, France, a corporation of France Filed July 8, 1957, Ser. No. 670,564

Claims priority, application France July 17, 1956

1 Claim. (Cl. 192—105)

This invention relates to clutches for automotive vehicles, of the type relying on centrifugal force for their operation.

Hitherto known centrifugal clutches have a common drawback, that is, the difficulty of properly adjusting their operating range, when it is desired to combine extreme smoothness of operation as required for a vehicle moving at a very moderate speed as, for example, when parking with a firm, slip-free drive when the engine delivers a substantial torque.

Various means have been proposed for avoiding this drawback; but these propositions have led generally to rather complicated and costly designs wherein the distribution of stresses was unbalanced.

It is an important object of this invention to provide a clutch control device, notably for disc clutches, adapted to meet the following requirements:

(1) Obtaining a moderate and gradual pressure application on the clutch disc at engine speeds slightly higher than idling speed;

(2) At engine speeds somewhat higher than those utilized for parking maneuvers, obtaining a clutch pressure increasing quickly with the engine speed in order efficiently to lock or engage the clutch and avoid any slipping during acceleration;

(3) Effecting a definitely symmetrical force throughout the surface of the clutch linings for obtaining a perfectly regular and gradual operation of the clutch and an even wear distribution;

(4) Permitting clutch disengagement irrespective of the engine speed.

The first requirement is obtained by using springs of moderate force whereby the clutch co-acting surfaces may be brought in contact or engagement at a velocity of rotation very slightly above the idling speed while allowing a certain degree of lining slipping as necessary for absorbing unavoidable irregularities in the reaction torque, for example.

The second requirement is satisfied by so providing the centrifugal system that the included weights may effect movements of greater amplitude and that the radius of rotation of their center of gravity increases considerably with engine speed, their action being transmitted through another spring assembly the flexibility of which is equal to or slightly greater than that of the springs of a conventional-type clutch fitted on or suitable for the vehicle concerned.

The third requirement hereabove is solved by the provision of several mechanical dispositions to be described more in detail presently, which have the purpose of:

Reducing the frictional contact between movable parts to a minimum in the centrifugal system, by using ball-mounted linkages and bearings;

Equalizing and synchronizing the movement of the centrifugal control weights by providing an adequate mechanical linkage therebetween, and making it possible to adjust the inoperative position when assembling the clutch.

In an assembly constructed in accordance with this invention, play take-up means may also be provided, according to any known and suitable disposition; however, due to the very low degree of wear observed under practical operating conditions this addition is not essential.

In order to afford a clearer understanding of the present invention and of the manner in which the same may be carried out in practice, reference will now be made to the attached drawing forming part of this specification and illustrating diagrammatically by way of example a typical embodiment of the invention. In the drawing:

Figure 1 is a diametral section of an improved centrifugal clutch according to this invention;

Figure 2 is a section taken upon line AA of Fig. 1;

Figure 3 is a fragmentary radial section showing a detail as per line CC of Fig. 2, and Figure 4 is a similar section taken upon line BB of Fig. 2.

Referring to the drawing and notably to Figs. 1 and 2, the device illustrated comprises five essential elements listed hereafter:

A stationary clutch plate assembly;
A movable clutch plate assembly;
A clutch disc assembly;
An automatic (centrifugal) clutch release mechanism;
A driver-controlled clutch release mechanism.

The stationary clutch plate assembly comprises a flywheel 23 rigidly fixed to the input shaft 1, a pressure ring 18 centered and bolted on the flywheel 23. The term "stationary" is used in this description as meaning that the "stationary" parts revolve bodily with the input shaft 1.

The movable clutch plate assembly comprises a movable pressure ring 20 and a ring 22. The ring 20 and ring 22 are assembled through the following elements:

(a) Driving pins 10 permitting a relative axial sliding movement between the parts;

(b) Springs 27 (Fig. 4) and cups 28 urging the rings away from each other;

(c) Stop members 21 limiting this relative movement of the rings away from each other.

The sliding drive of the movable clutch plate assembly with the stationary clutch plate assembly is effected through pins 9. A system comprising springs 30, cups 29 and pull-rods 31 (Fig. 3) constantly urges the movable clutch plate assembly away from the stationary clutch plate assembly to effect the clutch disengagement during the inoperative periods of the clutch. The movable clutch plate assembly thus constantly bears against the automatic clutch mechanism to be hereinafter described.

The clutch disc assembly comprises a clutch disc proper 19 and a hub 11 through which the output shaft 12 is driven.

The automatic clutch mechanism comprises arbors 3 in which helical grooves are formed; these arbors 3 are solid with the flywheel 23; weights 25 having bores formed with helical grooves corresponding to and registering with those of the arbors 3 are mounted on these arbors by means of balls 4 fitted in these helical grooves to permit the axial relative displacement of these weights.

The shape (Fig. 2) of these weights is such that they can effect an angular movement of relatively great amplitude and that the radius of rotation of their center of gravity increases considerably with the engine speed. Links 26 pivoted on the weights 25 through pins 2 are provided for interconnecting these weights.

Ball thrust bearings 7 and cases 6 transmit the axial movement of the weights to the movable ring 20. A race 8 may be interposed between the thrust bearing balls 7 and the ring 22.

The angular movement of the weights 25 is limited in the inoperative position by their engagement with the flywheel (see Fig. 2) and during the operation of the drive by their engagement with stops 32.

The drive-controlled clutch mechanism comprises abutments 16 secured on the ring 18; clutch release pins 17 are slidably fitted in bores formed in the ring 18 and act on the movable ring 20; in addition, clutch-release levers 15 are held in position by suitable screws 14, and a movable thrust bearing 13 permits the simultaneous displacement of the clutch-release levers.

The device described hereinabove operates as follows:

When the apparatus is inoperative:

Due to the action of springs 30, cups 29 and pull-rods 31 (Fig. 3) the movable clutch plate assembly bears through the ring 22, race 8, cases 6 and weights 25 against the flywheel 3 of the automatic clutch-engaging mechanism.

The axial pressure thus exerted on the weights 25 urges them back against the flywheel due to the presence of the helical grooves.

A clearance J sufficient to permit a complete clutch release is provided between the clutch disc 19 and the ring 20 by means of adjustable stop members 21 engaging the ring 22.

Another clearance $J_1 > J$ is also provided between the ring 20 and the ring 22. This clearance $J_1$ is equal to the travel effected by the ring 22, and should permit, when the ring 22 is in its maximum forward position (that is, with the weights 25 in their outermost position) to separate the clutch ring 20 from the clutch disc 19 by an amount equal to the clearance J to permit driver-controlled clutch release at high engine speeds in spite of the action provided by the automatic clutch.

In operation:

When the assembly rotates, the weights 25 are moved away from the flywheel by centrifugal force; this centrifugal force, due to the presence of the helical grooves, creates an axial force acting on the ring 22. This axial force is the clutch-operating force.

According to the value of this axial force, the following conditions obtain:

(1) When the axial force is lower than the aggregate force of the return spring 30, the position of the different movable parts is the same as in the inoperative condition. Consequently, the clearance J remains unchanged and the engine is disconnected from the final drive.

(2) When the axial force exceeds that of the return spring 30, these springs are compressed. The assembly comprising the ring 20 and ring 22 is moved and takes up the clearance J (the clearance $J_1$ remaining unchanged).

(3) As long as the axial force does not compensate the load of the return springs 30 plus that of the pressure springs 27 in their initial condition or length, the relative position of ring 20 and ring 22 remains unaltered. Yet, the ring 20 exerts a gradually increasing pressure on the clutch disc 19 and will progressively drive same.

(4) When the axial force is greater than the aggregate force of the return springs 30 plus the force of the pressure springs 27 in their initial condition or length, the pressure springs 27, ring 20 and ring 22 move toward one another until the weights 25 engage the stop members 32 and the axial force is thus prevented from further increasing; at this time the force exerted by the ring 20 on the clutch disc 19 is sufficient to provide a slip-free drive.

The residual clearance between the ring 20 and the ring 22 after these parts have been brought together by the compression of springs 30 should be sufficient to permit a complete, driver-controlled disengagement between the clutch disc 19 and the ring 20, with due consideration for the normal wear of the clutch linings.

Although the above description and the attached drawings refer to a single embodiment of the invention, it will be readily understood that this embodiment is given by way of example only and that many modifications and alterations may be brought thereto without departing from the spirit and scope of the invention as set forth in the appended claim.

What is claimed is:

A centrifugal clutch comprising input and output shafts, a movable clutch plate assembly comprising a pair of coaxial rings rotatably fixed to each other but slidable axially apart a predetermined extent, a clutch disc assembly mounted on the output shaft adjacent said clutch plate assembly and coacting with said clutch plate assembly, a stationary clutch plate assembly on the input shaft, movable weights connected to said stationary clutch plate and responsive to the centrifugal force on said stationary clutch plate assembly, means in said stationary clutch plate assembly defining helical grooves each concentric to an axis parallel to said shafts, means rotatably supporting said weights and defining helical grooves concentric with and forming pairs with the first said grooves, balls in the pairs of grooves for coupling said weights rotatably to the stationary assembly, a first set of springs between the stationary and movable assemblies and of relatively moderate strength which are responsive to the action of said weights, a second set of springs stronger than the springs of the first set and positioned in the movable assembly between the said rings, said second set of springs being responsive to a centrifugal force acting on said weights greater than that sufficient to compress said first set of springs, said rings being provided with registering holes, locking pins engaging in said registering holes for engaging the rings and limiting the axial spacing of the same, said second set of springs urging said rings away from each other, stop members on said rings limiting the displacement thereof, the stationary assembly being provided with windows permitting movement of said weights in response to centrifugal forces, arms interconnecting said weights so that the movement of said weights is coordinated, and at least one race on said movable assembly and balls in said race between the means rotatably supporting said weights and said movable assembly to facilitate imparting movement to said movable assembly.

References Cited in the file of this patent

UNITED STATES PATENTS

| | | |
|---|---|---|
| 1,461,343 | Barbarou | July 10, 1923 |
| 1,832,526 | Brown | Nov. 17, 1931 |
| 2,005,350 | Rickwood | June 18, 1935 |
| 2,091,269 | Colman | Aug. 31, 1937 |
| 2,107,075 | Lyman | Feb. 1, 1938 |
| 2,176,224 | Nutt | Oct. 17, 1939 |

FOREIGN PATENTS

| | | |
|---|---|---|
| 320,269 | Germany | Apr. 16, 1920 |
| 436,747 | Great Britain | Oct. 17, 1935 |